Figure 3:
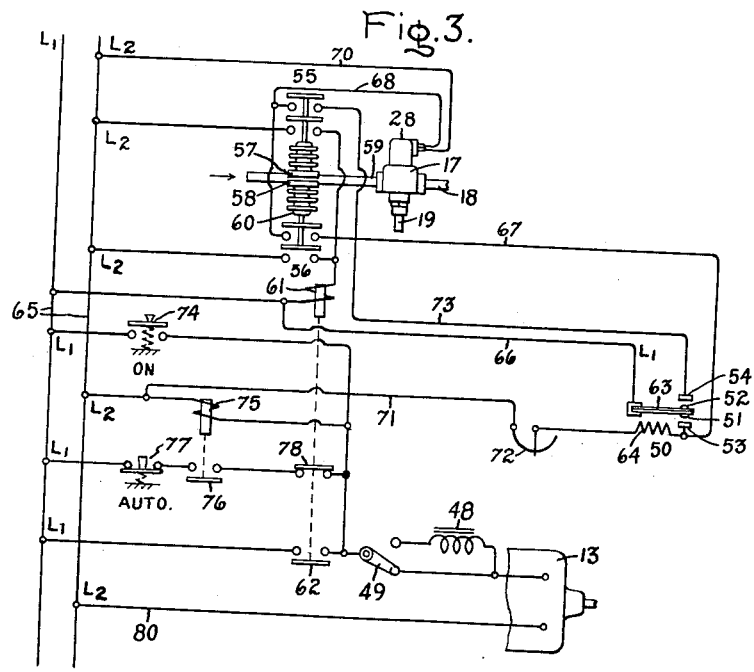

June 19, 1956
F. R. ELLENBERGER
2,751,152
AIR CONDITIONING CONTROL SYSTEM
Filed Aug. 7, 1952
2 Sheets-Sheet 1
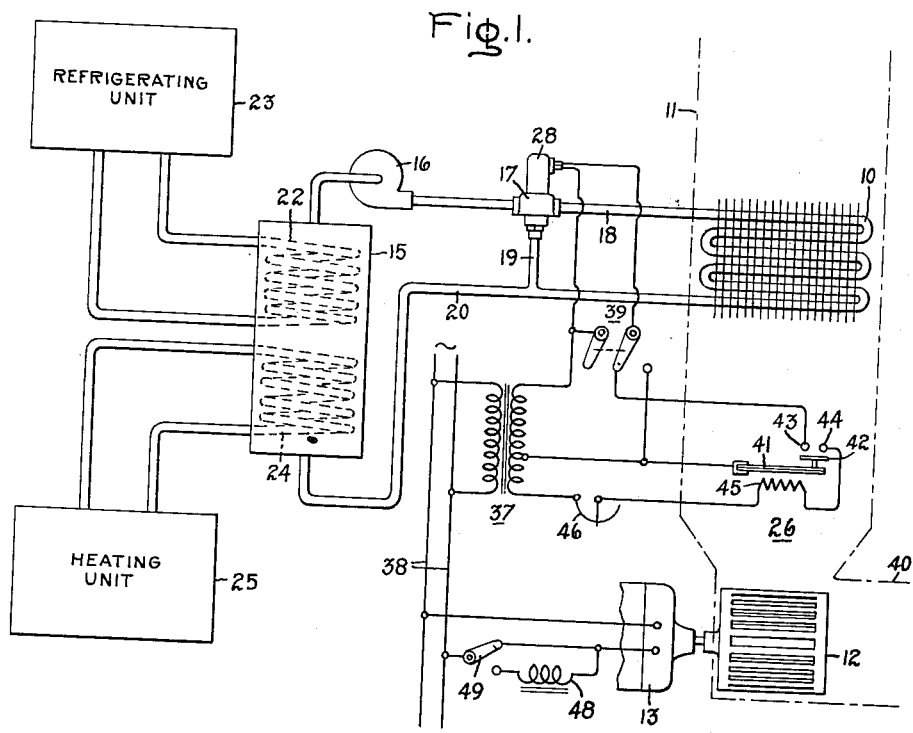
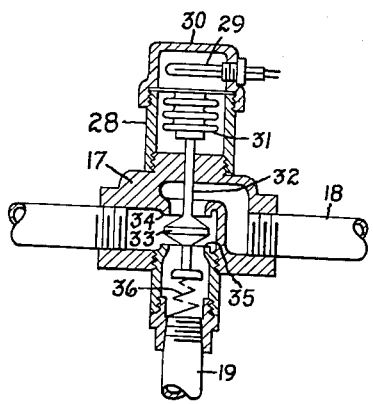
Inventor:
Francis R. Ellenberger,
by William G. Edwards, Jr.
His Attorney.

June 19, 1956

F. R. ELLENBERGER 2,751,152

AIR CONDITIONING CONTROL SYSTEM

Filed Aug. 7, 1952

2 Sheets-Sheet 2

Inventor:
Francis R. Ellenberger,
by William C. Edwards, Jr.
His Attorney.

United States Patent Office 2,751,152
Patented June 19, 1956

2,751,152

AIR CONDITIONING CONTROL SYSTEM

Francis R. Elienberger, Verona, N. J., assignor to General Electric Company, a corporation of New York Application August 7, 1952, Serial No. 303,065

4 Claims. (Cl. 236—1)

This invention relates to air conditioning systems and particularly to automatically controlled systems for both heating and cooling.

Frequently it is desirable to provide an air conditioning system which can be controlled automatically throughout the year to provide both heating in the winter and cooling in the summer. In such systems an automatic control is desirable in order to minimize the attention and servicing of the system which might otherwise be required, particularly during the spring and fall when frequently shifting of the control between heating and cooling operations may be required. Furthermore, it is desirable that the temperature control of air conditioning systems be effected continuously with minimum sudden changes; in other words, it is desirable to provide a modulating control. Accordingly, it is an object of this invention to provide an air conditioning system for heating and cooling including an improved arrangement for effecting modulating action of the temperature control.

It is another object of this invention to provide a fluid heating and cooling system wherein the flow of heat transfer fluid to the heat transfer unit is modulated automatically by a single thermostat both in the heating and the cooling seasons.

Further objects and advantages of the invention will become apparent as the following description proceeds, and the features of novelty which characterize the invention will be pointed out with particularity in the claims annexed to and forming a part of this specification.

In carrying out the objects of this invention in one embodiment, a combined summer and winter air conditioning system is provided with a heat transfer coil through which either heating or cooling fluid is circulated under control of a modulating valve actuated by a heat motor controlled by a single cycling thermostat responsive to the temperature of the air to be conditioned and connected to vary the energization of the heat motor continuously but in an opposite sense for the heating and cooling operations. The valve is arranged to open upon an increase of heat supplied to the heat motor, and the thermostat operates to supply an increased average amount of heat to the motor upon a fall in temperature of the air during the heating season and to supply decreased amounts of heat to the heat motor upon a fall in temperature during the cooling season. In a further modification of the invention, an automatic switchover control is provided to effect a change-over from the heating to the cooling operation upon a change of the supply of heat transfer fluid from heating to cooling. In another embodiment the control is applied to a system wherein face and by-pass dampers are employed to control the flow of air over the heat transfer coil.

Figure 4:
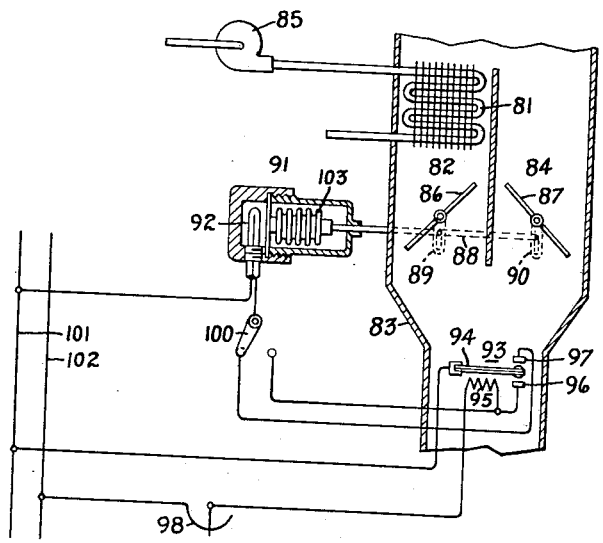

For a better understanding of the invention, reference may be had to the accompanying drawings in which Fig. 1 illustrates diagrammatically an air conditioning system provided with a control embodying the invention; Fig. 2 is an enlarged sectional view of the control valve and heat motor of Fig. 1; Fig. 3 is a view similar to Fig. 1 illustrating another embodiment of the invention; and Fig. 4 is a diagram of a portion of the control circuit showing its application to a damper controlled system.

Referring now to the drawing, the air conditioning system illustrated in Fig. 1 comprises a finned heat transfer unit or coil 10 arranged in a duct indicated by the broken line 11 through which air is circulated by a blower 12 driven by an electric motor 13. A suitable heat transfer liquid, which may be water, is supplied to the coil 10 from a tank 15 by operation of a pump 16, and the flow of water to the coil is controlled by a valve 17 which proportions the flow of water from the pump 16 through an inlet conduit 18 of the coil 10 and a by-pass conduit 19 which directs the water to a return line 20 connected to the bottom of the tank 15. The liquid in the tank 15 may be cooled by circulating a suitable refrigerant through a coil 22 from a refrigerating unit 23, or it may be heated by circulating a heating medium through a coil 24 from a heating unit 25. The controls for the refrigerating and heating units have not been illustrated, as they are not necessary to an understanding of the present invention.

The operation of the air conditioning system is controlled by a thermostat 26 arranged in the duct 11 on the inlet side of the coil 10. The thermostat 26 is of the cycling type and is arranged to energize a heat motor 28 for actuating the valve 17. The heat motor 28, as indicated in Fig. 2, may comprise an electrical resistance 29 arranged within a housing 30 to vary the temperature therein and thereby cause a bellows 31 to move in accordance with the temperature. The bellows 31 is connected through a rod 32 to move a valve member 33 between ports 34 and 35 controlling the flow of water to the coil 10 and by-pass 19 respectively. The valve 33 is biased to its closed position by a suitable compression spring 36 which will maintain the valve 33 closed against the port 34 at all temperatures of the bellows 31 below a predetermined minimum. At a predetermined high temperature of the bellows 31, the valve 33 will close the port 35. Within the intermediate range of temperatures the valve 33 is moved in accordance with changes in temperature, as indicated by the thermostat 26 which varies the excitation of the heater 29 in accordance with the temperature of the air in the duct 11. The thermostat 26 and heater 28 are connected to the secondary of a transformer 37, the primary of which is connected across power supply lines 38. The system may be operated either on a heating or cooling cycle by a double-blade, single-throw selecting switch 39. This switch may be actuated automatically or manually, the latter arrangement being illustrated for the sake of simplicity. With the switch 39 in its left-hand position as illustrated, the system is set for operation during the heating season, the liquid in the tank 15 being heated by operation of the unit 25. It will readily be understood that the duct 11 is connected to receive air from a space to be conditioned through the fan inlet indicated at 40 and to deliver the air through a suitable outlet conduit (not shown). When the return air flowing over the thermostat 26 is at a temperature less than a predetermined value, say 72° F. a bimetallic blade 41 of the thermostat bends upwardly until its contact bar indicated at 42 engages contacts 43 and 44. Closing of these contacts connects a small heating coil 45 across a portion of the secondary of the transformer 37. This heats the blade 41, tending to move it away from the contacts. While the contacts are closed the heater 29 is also connected across a portion of the secondary of the transformer through the right-hand blade of the switch 39 and the blade 41 of the thermostat. As the blade 41 is heated it again moves away and breaks the connection through the contacts 43 and 44. The thermostat is thus a cycling thermostat and opens and closes the contacts at a rate determined by the temperature of air flowing through the duct. The higher the temperature within a preselected range, the shorter the period during which the contacts are closed and therefore the lower the amount of heat supplied to the heat motor 28. A thermostat of this type may be adjusted to maintain temperatures within a range of, say, 2° so that the temperature of the air flowing through the duct may be maintained between, say, 70° and 72° during the heating season. The amount of liquid flowing from the tank 15 through the coil 10 is thus determined by the amount of heat supplied to heat motor 28, and the variations in position of the valve 33 will take place continuously and in accordance with variations in the temperature of the air circulated over the thermostat 26. The range of operation of the thermostat 26 may be adjusted by a variable resistor 46 in the circuit of the heater 45.

When the switch 39 is moved to its right-hand position the heater 29 of the heat motor 28 is connected directly across the upper portion of the secondary of the transformer 37 and is arranged to be short circuited upon closing of the contacts 43 and 44 and to establish a circuit through the blade 41 and the left-hand blade of the switch 39, thereby deenergizing the resistance 29 whenever the blade 41 engages its contacts upon lowering of the temperature to a preselected minimum value. It will thus be apparent that the operation of the thermostat 26 for cooling is in the opposite sense from that during heating, the resistance 29 being deenergized when the thermostat makes contact and energized when the contacts are open. Thus the energization of the resistance heater 45 while the contacts are closed opens the blade 41 and again energizes the resistance 29.

Under some conditions of operation it may be desirable to operate the fan motor 13 at reduced speed, and a reactance coil 48 is provided for this purpose. It may be connected in series with the motor 13 by operation of a single-pole, double-throw manual switch 49.

It will thus be apparent that the air conditioning system of Fig. 1 may be operated during both the heating and cooling season by merely shifting the manual control 39 from the heating to the cooling position whenever the refrigerating unit and heating unit are interchanged in operation, it being understood that the refrigerating unit 23 and heating unit 25 are controlled so that each is in operation depending upon the demands of the system for heating or cooling.

In Fig. 3 there is illustrated a control system for use with the air conditioning system of Fig. 1 wherein the change-over from winter operation to summer operation is effected automatically in accordance with the temperature of the heat transfer liquid supplied to the coil 10. Except for the electric controls, this system is the same as that of Fig. 1 and corresponding parts have been designated by the same numerals. In the system of Fig. 3, a duct thermostat indicated at 50 is also of the cycling type but differs from the thermostat 26 in that it is provided with front and back contacts 51 and 52 arranged to engage fixed contacts 53 and 54 respectively. In Fig. 3, the change-over from heating to cooling and vice versa is accomplished by automatic switches responsive to the temperature of the liquid supplied to the valve 17. This change-over control comprises a heating cycle control 55 and a cooling cycle control 56 having temperature responsive elements 57 and 58 respectively, both responsive to the temperature of the liquid flowing through the supply conduit of the valve 17 indicated at 59, this being the conduit connecting the pump 16 and the valve 17. During the heating season when hot water is supplied through the conduit 59, a bellows 60 of the control 56 expands and closes the control contacts thereby connecting the heat motor 28 to the contact 53 through the upper set of contacts and closing a circuit through a relay 61 through the lower set of contacts to energize the fan motor 13 through a relay switch 62. Air is thus circulated through the duct 11 and is heated by circulation over the coil 10. Should the temperature of the air about the thermostat 50 be below a predetermined value, the blade of the thermostat indicated at 63 will move downward, engaging contacts 51 and 53 and completing a circuit for the resistance 29 and motor 28 and also energizing a thermostat heating coil 64 corresponding to the coil 45 of Fig. 1. These circuits may be traced from the left-hand side of power supply lines 65 through a connection 66 and the blade 63 to the contact 53 and thence to the heat motor through a connection 67, the upper contacts of the switch 56 and a lead 68 and to the right-hand side of the power line 65 through a connection 70, the heater 64 being connected to the right-hand side of the line 65 through a connection 71 and an adjustable resistance 72. The cycling action of the thermostat 50 is similar to that of the thermostat 26 and occurs at a rate determined by the temperature of the air flowing through the duct. Thus the heat motor 28 is energized to modulate the flow of heat transfer liquid through the coil 10 automatically in accordance with the demands of the heating season.

During the cooling season when cold water is supplied through the conduit 59, the bellows 57 and 58 contract opening the contacts of the switch 56 and closing the contacts of the switch 55. Closing of the lower set of contacts of the control 55 energizes the coil 61 and starts the fan motor 13, while closing of the upper set of contacts connects the heat motor 28 to the contact 54 through a connection 73. During the cooling operation when the temperature of the air flowing through the duct rises above a predetermined value, say 80° F., the blade 63 moves up to cause engagement of the contacts 52 and 54 and thereby energize the resistance 29 of the heat motor 28 and move the valve 17 toward its open position. As the temperature of the air is lowered the blade 63 is disengaged from contact 54 and engages the contact 53 thereby connecting the heater 64 across the supply lines. Thus heat is supplied to the motor 28 on a rise in temperature in the opposite sense to the operation of the system during the heating season.

The switch coil 61 is energized only when one of the switches 55 and 56 has been operated. Thus the motor 13 is not energized automatically during the temperature range between the temperatures of the heated and cooled water supplied to the coil 10; however, it may be desirable to operate the blower 12 when the heat transfer unit 10 is neither heating nor cooling the air, and for this purpose there is provided a manual push-button control 74 which is biased to its open position. When the button 74 is depressed it connects a coil 75 across the lines 65. This actuates a switch 76 which closes the fan motor circuit from the left-hand supply line through a normally closed manual push-button switch 77, the contacts of the switch 76, normally closed contacts 78 of the control switch 61, manual speed selector switch 49, the motor 13 and back to the line through a return connection 80. This circuit also provides a holding circuit for the coil 75 which maintains the coil energized after the push-button 74 has been released. When it is desired to return to automatic operation the push-button 77 is depressed to open its contacts and thereby open the holding circuit of the coil 75 and restore the switch 76 to its normally open position. Automatic operation is also restored by the actuation of either of the control switches 55 or 56 to energize the coil 61 and open the contacts 78.

It is thus apparent that a simple and effective control arrangement has been provided for automatically effecting the control of a heating and cooling system whenever the supply of heat transfer liquid is changed from heating to cooling.

In the system of Fig. 4 a thermostatic control is employed to actuate face and by-pass dampers to vary the amount of air to be conditioned which flows over the heat transfer coil. As illustrated in Fig. 4, a coil 81 is arranged in a left-hand portion 82 of a duct 83. Portion 82 is by-passed by a portion 84 so that air may be circulated through the duct without passing over the surface of the coil 81. The heat transfer liquid is circulated from a tank, such as the tank 15 of Fig. 1, by operation of a pump 85 and the amount of effective heat transfer between the coil 81 and the air in the duct 83 is controlled by face and by-pass dampers 86 and 87 respectively. These dampers are connected by a linkage comprising an operating arm 88 and damper arms 89 and 90 respectively in a manner such that when the damper 86 is moved toward its open position the damper 87 moves toward its closed position and vice versa. This method of control is well known in the art and by modulating the action of the dampers 86 and 87 the temperature of the air circulated through the duct 83 may be maintained within narrow limits. The dampers 86 and 87 have been shown as controlled by a heat motor 91 having an electric heater 92 energized in accordance with the operation of a thermostatic control 93 of the same type as that illustrated in Fig. 3. The control comprises a bimetallic thermostat blade 94 and a heater 95 corresponding to the blade 63 and heater 64 of Fig. 3. The thermostat is provided with contacts 96 and 97 corresponding to contacts 53 and 54 of Fig. 3 and an adjustable rheostat 98 corresponding to the rheostat 72. Instead of the automatic control for changing from the heating to the cooling position, a manual single-blade, double-throw switch 100 is employed to connect the heater 92 selectively to either of the contacts 96 or 97 of the thermostat 93. Power for energizing the heater is supplied from lines 101 and 102.

During the cooling season the switch 100 is connected to the contact 97 as illustrated and during the heating season to the contact 96. The cycling operation of the thermostatic control 93 is the same as that of the control 50 of Fig. 3, and the motor 91 operates to position the dampers 86 and 87 in accordance with the expansion and contraction of a bellows 103 as determined by the average amount of heat supplied by the heater 92. Thus more or less of the air flowing through the duct 83 is circulated over the coil 81, and the amount of heat supplied to the air is thus modulated in accordance with the operation of the duct thermostat 93.

It will be readily be understood that operation of the heat transfer control device, i. e. either the valve member 33 of the valve 17 or the dampers 86 and 87, is such that it takes a position dependent upon the average temperature of the air to be conditioned and that the operation of the cycling thermostat is such as to provide continuous variation or modulated operation of the heat transfer control device in accordance with temperature variations of the air. This control can be adjusted to effectively maintain temperatures within a range of, say, 2° F. and thereby avoids discomfort caused by sudden variations in temperature of the air returned to the rooms being conditioned.

While particular circuit arrangements have been illustrated and described, modifications will occur to those skilled in the art and it is desired that the invention be not limited to the specific details illustrated and described, and it is intended by the appended claims to cover all modifications which fall within the spirit and scope of the invention.

What I claim as new and desire to secure by Letters Patent of the United States is:

1. A control system for controlling the heat transfer between a heat transfer fluid and a second fluid to be conditioned in accordance with changes in the temperature of said second fluid, said system comprising a device for controlling the rate of heat transfer between said fluids, a heat operated motor including an electrical resistance for actuating said device and for modulating the position of said device in accordance with the energization of said resistance, a thermostat responsive to the temperature of said second fluid, a pair of electrical contacts positioned to be closed by said thermostat at a predetermined low temperature, and switching means selectively movable to a first position for connecting said resistance to be energized upon closing of said contacts and to a second position to connect said resistance to be energized when said contacts are opened and to be shorted out upon closing of said contacts whereby said first and second positions effect opposite response of said device upon a like change in temperature.

2. A control system for controlling the heat transfer between a circulating heat transfer fluid and air comprising a device for controlling the rate of heat transfer between the air and said fluid, a heat operated motor including an electrical resistance for actuating said device and for modulating the position of said device in accordance with the energization of said resistance, a thermostat positioned to be responsive to the temperature of said air, a pair of electrical contacts positioned to be closed by said thermostat at a predetermined low temperature, an electric heater for said thermostat connected to be energized when said contacts are closed, and selectively operable switching means movable to a first position for connecting said resistance to be energized upon closing of said contacts and to a second position to connect said resistance to be energized when said contacts are opened and to be shorted out upon closing of said contacts whereby said first and second positions effect opposite response of said device upon a like change in temperature.

3. A control system for controlling the heat transfer between a heat transfer coil and air comprising means for controlling the rate of heat transfer between the air and said coil, a heat operated motor including an electrical resistance for actuating said control means and for modulating the position of said control means in accordance with the energization of said resistance, a thermostat positioned to be responsive to the temperature of the air, front and back contacts on said thermostat, a first electrical contact positioned to be engaged by said back contact above a first predetermined temperature, a second electrical contact positioned to be engaged by said front contact below a second predetermined temperature, a heater for said thermostat connected to be energized upon engagement of said front and second contacts, and selectively operable switching means movable to a first position for completing a circuit through said resistance upon engagement of said back and first contacts and to a second position for connecting said electrical resistance to said front contact to effect continuous excitation of said resistance while said front and second contacts are out of engagement and to short circuit said resistance upon engagement of said front and second contacts whereby said first and second positions effect opposite response of said control means upon a like change in temperature.

4. A control system for controlling the flow of a heat transfer liquid in heat exchange with air comprising a modulating valve having an inlet and an outlet for supplying the heat transfer liquid into heat exchange relationship with said air, a heat operated motor including an electrical resistance for actuating said valve and for modulating the position thereof in accordance with the energization of said resistance, a thermostat responsive to the temperature of the air supplied thereto, switching means selectively movable to one position for connecting said thermostat to energize said resistance upon a decrease in temperature of the air and to a second position to deenergize said resistance upon a decrease in temperature of the air, and means responsive to respective predetermined high and low temperatures of the liquid supplied to said valve for effecting movement of said switching means to said first and second positions.

References Cited in the file of this patent

UNITED STATES PATENTS

| | | |
|---|---|---|
| 1,854,289 | Barker | Apr. 19, 1932 |
| 1,883,243 | Bogle | Oct. 18, 1932 |
| 2,121,625 | Crago | June 21, 1938 |
| 2,383,811 | Miller | Aug. 28, 1945 |
| 2,495,226 | Crago | Jan. 24, 1950 |
| 2,495,227 | Lum | Jan. 24, 1950 |
| 2,511,677 | Spofford | June 13, 1950 |
| 2,547,657 | Olsen | Apr. 3, 1951 |
| 2,555,012 | Spofford | May 29, 1951 |
| 2,630,273 | Suesserott | Mar. 3, 1953 |